United States Patent [19]

Sirven

[11] 3,958,242
[45] May 18, 1976

[54] SYSTEM FOR MEASURING THE VELOCITY OF A MOVING OBJECT
[75] Inventor: Jacques Sirven, Paris, France
[73] Assignee: Thomson-CSF, Paris, France
[22] Filed: Aug. 22, 1974
[21] Appl. No.: 499,564

[30] Foreign Application Priority Data
Aug. 24, 1973 France .............................. 73.30738

[52] U.S. Cl. .................................. 343/8; 343/16 M
[51] Int. Cl.² ............................................ G01S 9/44
[58] Field of Search .............................. 343/8, 16 M

[56] References Cited
UNITED STATES PATENTS
| | | | |
|---|---|---|---|
| 3,343,166 | 9/1967 | Poinsard........................... | 343/16 M |
| 3,438,030 | 4/1969 | Dickey, Jr. .................... | 343/16 M X |
| 3,618,093 | 11/1971 | Dickey ......................... | 343/16 M X |
| 3,680,102 | 7/1972 | Poinsard........................... | 343/16 M |

*Primary Examiner*—T. H. Tubbesing
*Attorney, Agent, or Firm*—Karl F. Ross; Herbert Dubno

[57] ABSTRACT

The invention relates to a system for measuring the velocity of a moving object with respect to the ground as projected onto an axis, using the Doppler effect. Two signals $\Sigma + kj\Delta$ and $\Sigma - kj\Delta$ are produced from received signals $\Sigma$ and $\Delta$, $k$ being a coefficient which depends on the velocity of the moving object and on a predetermined duration T. Measuring the difference between the phase of signal $\Sigma - kj\Delta$ and that of signal $\Sigma + kj\Delta$ after the latter has been delayed by duration T produces a signal proportional to the velocity sought. The invention is applicable to aerial or marine navigation systems.

6 Claims, 5 Drawing Figures

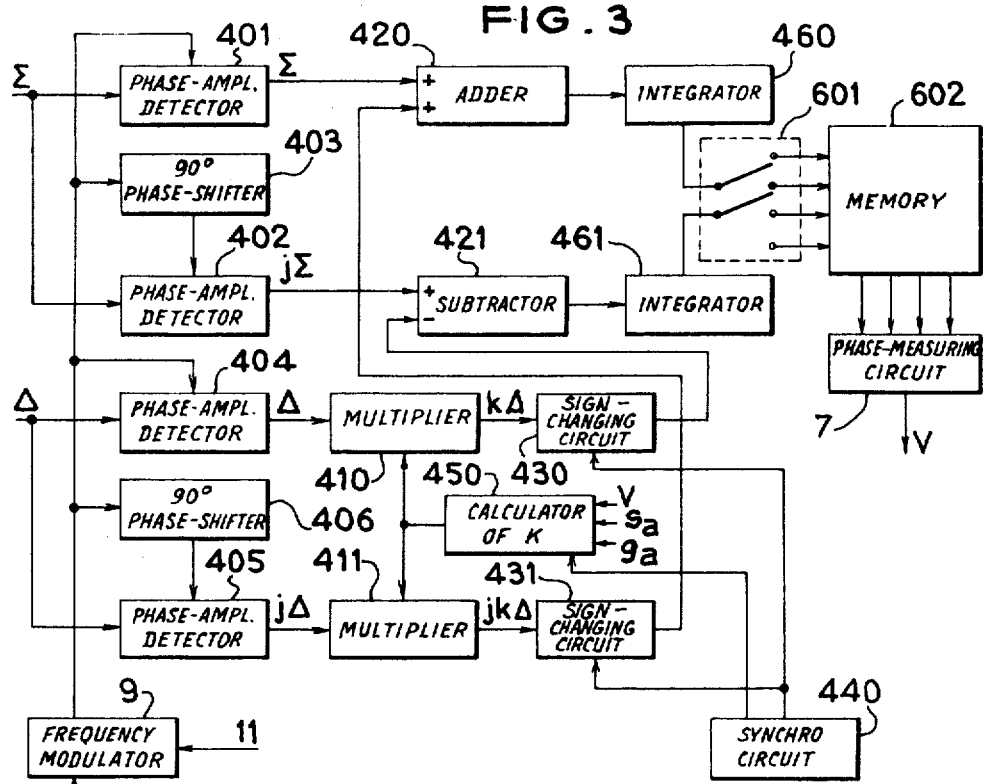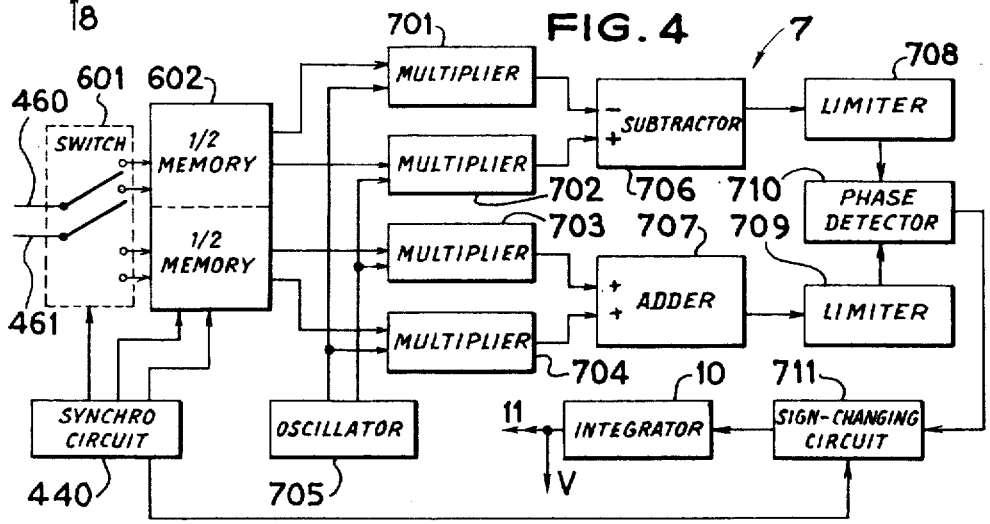

3,958,242

SYSTEM FOR MEASURING THE VELOCITY OF A MOVING OBJECT

BACKGROUND OF THE INVENTION

The present invention relates to a system for measuring the velocity of a moving object in relation to a fixed object such as the ground or sea surface of the seabed. It relates particularly to a system which employs the Doppler effect to measure the velocity of the moving object on board which it is situated as projected onto one or more reference axes.

Known systems of this type, such as Doppler radar systems for serial navigation, transmit electromagnetic waves towards the ground and measure the difference in frequency between the transmitted waves and those reflected by the ground. This difference in frequency is proportional to the velocity of the moving object. However, the spectrum of the ground echoes is spread over a certain frequency range. This frequency range becomes the wider the greater the angular extent of the main lobe of the antenna of the radar is and the farther away the line of the direction of the antenna is from that of the velocity vector of the moving object. To ensure that measurement is not excessively inaccurate it is necessary to use a very directional, and therefore large, heavy and cumbersome, antenna or antennas which give a very fine lobe.

The measuring system according to my invention does not have these drawbacks. It measures the velocity of the moving object on the basis of the difference in phase of the signal reflected by the ground at two different instants and, to give increased accuracy, it uses at the input to the measuring circuits signals which are a linear combination of the sum and difference signals from a monopulse receiver, this being done to bring about an artificial shift in the phase center of the antenna.

SUMMARY OF THE INVENTION

In accordance with the invention, a system for measuring the velocity of a moving object as projected onto a reference axis comprises means for transmitting waves along that axis, a monopulse antenna, trained along the axis, which is associated with receiver circuits which supply a sum signal $\Sigma$ and a difference signal $\Delta$, means for combining the $\Sigma$ and $\Delta$ signals for producing signals $\Sigma + kj\,\Delta$ and $\Sigma - kj\,\Delta$, $k$ being a coefficient which depends on the estimated velocity of the moving object, on the angle between the velocity vector and the axis, and on a predetermined duration T, and means for measuring the difference between the phase of the $\Sigma - kj\,\Delta$ signal and that of the $\Sigma + kj\,\Delta$ signal when the latter is delayed by time T, this difference in phase being proportional to the velocity as projected onto the axis.

Even greater accuracy is achieved by using the output signal from the measuring means to shift the frequency of the reference signal used to demodulate the received signals by an amount equal to the Doppler frequency. In this way I obtain a control loop whose gain and pass band make it possible to improve the accuracy of the system.

In accordance with another feature of the invention, the means for demodulating the received signals are fed with a reference signal obtained by means of an integrator which receives the output signal from the phase-measuring means, a fixed-frequency oscillator, and a frequency-modulator circuit which is coupled to the integrator and to the oscillator and supplies the reference signal.

BRIEF DESCRIPTION OF THE DRAWINGS

Other features of the invention will become apparent from the following description given with reference to the accompanying drawings wherein:

FIG. 3 is a block diagram of part of a preferred embodiment of a measuring system;

FIG. 4 is a block diagram showing details of a phase-measuring circuit included in the systems of FIGS. 1–3; and, FIG. 5 is a set of graphs showing the signal waveforms at various points in the system as a function of time.

SPECIFIC DESCRIPTION

Figure 1:
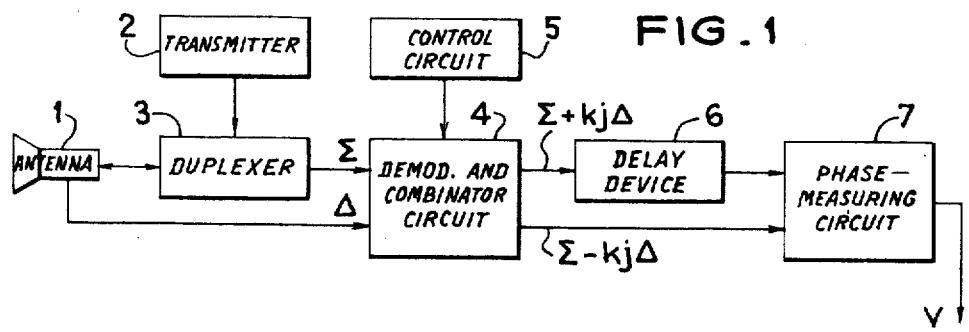
FIG. 1 is a block diagram illustrating the principle of a velocity-measurement system according to the invention.

A monopulse antenna 1, FIG. 1, is secured to a moving object whose velocity it is desired to measure. If the moving object is an aircraft, the axis of the antenna is directed towards the ground and the system then measures a projection of the velocity on this axis. The antenna 1 has a sum channel which is common to reception and transmission and a difference channel which is used solely for reception. The sum channel is connected to a transmitter 2 via a duplexer 3. The reception output of the duplexer 3 and the difference channel of the antenna 1 are connected to a circuit 4 which demodulates and combines the sum signal $\Sigma$ and the differnce signal $\Delta$ in order to give two other signals $\Sigma + kj\,\Delta$ and $\Sigma - kj\,\Delta$, the coefficient k being supplied by a control circuit 5. This coefficient depends on the estimated velocity V of the aircraft, on the angular difference between the axis of the antenna and the velocity vector, and on a predetermined duration T. Estimated velocity is measured by an ancillary measuring system which is not shown, such as an anemometer. The signal $\Sigma + kj\,\Delta$ is applied to a delay device 6. A phase-measuring circuit 7 measures the phase difference between the signal $\Sigma + kj\,\Delta$ when delayed by duration T and the undelayed signal $\Sigma - kj\,\Delta$. The output signal from the measuring circuit is proportional to the velocity being sought. It is then applied to a display device on the pilot's instrument panel, or to a recorder. These items of equipment are not shown.

The system according to the invention so far described is applicable both to pulse-transmitting systems and also to continuous-wave-transmitting systems, provided they are of the coherent type. The transmission and reception circuits which supply the intermediate-frequency signals $\Sigma$ and $\Delta$ will not be described since they are circuits well known to the man skilled in the art and do not form the main subject of the invention. The combining means 4, 5 and the delay and measuring circuit 6, 7 will be described in detail hereinafter.

When associated with an antenna for monopulse reception, the purpose of the combining means 4, 5 is to bring about an artificial shift in the phase center of the antenna 1. The object of such an operation and its advantages are described in Chapter 18 of the "RADAR HANDBOOK" by M. I. Skolnick, published by McGraw-Hill, and are summarized below:

Let $g_a$ and $s_a$ be the azimuth and the elevation of the axis of the antenna with respect to an axis coincident with the vector representing the velocity of the aircraft. If an object is situated along the axis of the antenna, the frequency of the signal received by the radar relative to that of the transmitted signal will be shifted by an amount equal to the Doppler frequency $f_d$:

$$f_d = (2V/\lambda)(\cos g_a \cos s_a)$$

where V is the velocity of the aircraft, and λ the wavelength of the transmitted wave. However, certain echoes from the ground may not originate at points situated on the axis of the antenna and may therefore give rise to Doppler frequencies $(2V/\lambda)(\cos g \cos s)$ which are distributed about the mean value $f_d$, s and g being the elevation and azimuth values of the objects on the ground which produce these echoes. The result is that there is a spread in the spectrum of ground echoes around the value $f_d$. This spread is the more pronounced the farther the echoes are away from the axis of the antenna and the phenomenon becomes the more marked the farther the axis of the antenna deviates from the line along which the velocity vector lies. These echoes may therefore cause incorrect phase measurements and thus an incorrect measurement of velocity.

By using the signal which is received on the azimuth difference channel of a monopulse radar, it is possible to compensate for these phase errors. A fraction of the difference signal (which is 90° out of phase) is added to the sum signal in the course of a first measurement and is substracted in the course of the next measurement. The measurement of velocity is made on the basis of the composite signal $\Sigma + kj \Delta$ which is received at the time $t_o$ and of the composite signal $\Sigma - kj \Delta$ which is received at time $t_o + T$.

A calculation enables the determination of the value of the coefficient $k$, this coefficient depending on the velocity of the aircraft, the length of time T, the wavelength λ, and the divergence between the axis of the antenna and the axis of the velocity vector:

$$k = q(V/\lambda) T \cos g_a \sin s_a$$

$q$ being a constant which is determined when the system is being adjusted.

In the case of a pulsed radar, duration T is made equal to the repetition period of the radar pulses.

The control circuit 5 determines which value of $k$ is to be applied to the combining circuit, on the basis of the aforementioned factors. The constant $q$, duration T and wavelength λ may be fixed values. Velocity V is produced by a less accurate ancillary measuring system and the angles of elevaton $s_a$ and azimuth $g_a$ of the antenna are given by position detectors, particularly if the antenna is a mobile one, as it is for example when it is desired to obtain three projections of the velocity vector in three directions which may or may not be mutually orthogonal. The direction of the velocity vector which the system determines in this way may, in addition, be compared to the position of the antenna to produce more accurate values of $s_a$ and $g_a$.

Signal $\Sigma + kj \Delta$ is delayed at 6 for a time T so that it may be compared with signal $\Sigma - kj \Delta$. The phase comparison carried out in circuit 7 gives the desired indication of the velocity of the aircraft.

To obtain a vector for aircraft velocity in magnitude and direction it is necessary to have either at least three measuring systems of this type, or a single system which is connected to three fixed antennas in succession or to a single antenna which is successively oriented in three different directions.

Figure 2:
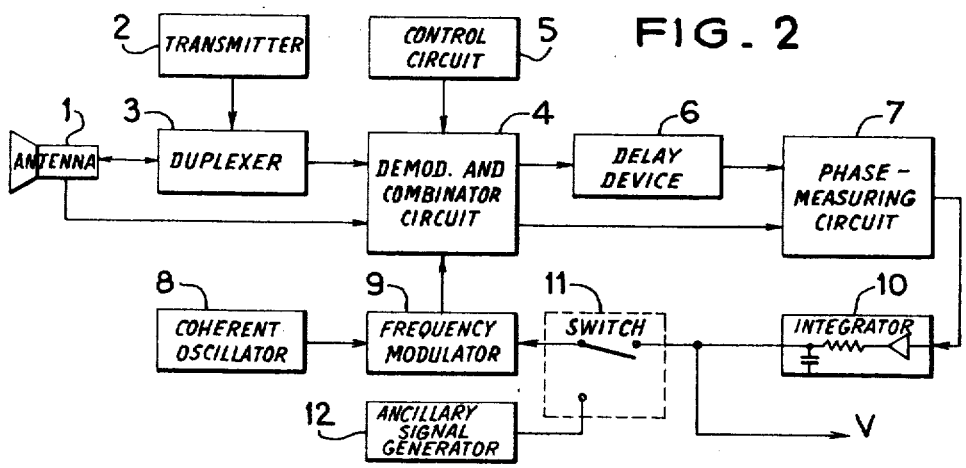
FIG. 2 is a similar diagram of a more sophisticated system which includes a frequency-controlling loop.

FIG. 2 shows a modification of aforedescribed system in which the output signal from the phase-measuring circuit 7 is used to shift the demodulation reference frequency for stabilizing the output voltage of circuit 7 representative of velocity V.

It has been assumed in this example that the intermediate-frequency signals are demodulated in circuit 4. To allow this to be done, the reference signal for demodulation is usually supplied by a coherent oscillator 8 whose output is held in phase with the oscillations of the transmitted waves. Instead of being used for demodulation as it is, the output signal from oscillator 8 is applied to a single-sideband frequency modulator 9, which shifts the frequency of the reference signal by an amount equal to the Doppler frequency $f_d$. At a control input, the frequency modulator 9 receives a continuous signal of an amplitude proportional to the shift in frequency which is to be brought about. This control signal is the output signal from measuring circuit 7 after it has been amplified and integrated in an integrator 10. The output of integrator 10, which is connected to the control input of modulator 9, also provides the output signal from the system, which is proportional to the velocity of the moving object.

The purpose of the control loop formed in this way, feeding back a corrective voltage to modulator 9, is to reduce the danger of measurement errors by reducing the pass band of the measuring system, which cuts down noise and increases the dynamic accuracy of the system.

A switch 11 is inserted between the output of integrator 10 and the input of modulator 9 and allows the latter input to be connected either to the integrator in normal operation, with the loop closed, or to an ancillary signal generator 12 which allows the control loop to be pre-set before it is closed.

The signal supplied by the ancillary generator 12 should approximate that which integrator 10 will produce when the loop is closed. The level of this signal is calculated on the basis of the data from the navigation system, i.e. from an indication of estimated velocity.

In the case of the pulsed radar system whose repetition perioid is $T = 1/f_r$, it is necessary that the frequency shift in the demodulation reference should range between $-f_r/2$ and $+f_4/2$, which is the condition for the control loop to lock and be stable. This being so, the value of the measured velocity is not affected by slight variations in the repetition frequeency $f_r$. If the estimated velocity is inaccurately indicated, one method of finding out whether the control by the feedback loop is taking place properly is to wobble the repetition frequency $f_r$. If no fluctuation appears at the output of the system, the control operates correctly; if the measurement of velocity varies with the wobble rhythm, the control is wrong and the loop must be opened by connecting modulator 9 to generator 12 and a correct value of control signal must be found.

Up to this point the system according to my invention has been described in very general terms so as to make clear the principle on which it operates. This principle is applicable to airborne radar systems which transmit electromagnetic signals into space and receive them therefrom. It is likewise applicable to sonar systems on ships which transmit and receive acoustic signals. In either case the received signals Σ and Δ are processed in a similar way. As to the transmission and reception of the signals, the circuits and components used will differ to suit the case.

In the first case the transmitter, the antenna and the input reception circuits are conventional and existing equipment may be used, in the same way as in the second case where the antenna and the transmission and reception circuits are of a different type on account of the different nature of the waves being transmitted and received and of the propagation medium. In particular the antenna will be made up of a plurality of components.

The preferred embodiment described below is a measuring system of the pulsed radar type.

The transmission and reception sections are well known and will not be specifically described; only the section for processing the intermediate-frequency sum signal Σ and difference signal Δ will be discussed.

In particular, FIG. 3 shows details of the combining circuit shown at 4 in FIGS. 1 and 2. The $\tau$ and Δ signals are demodulated in two channels in quadrature, i.e. in a sine and a cosine channel, so that they preserve their phase angle throughout processing since it is the phase which is used to measure velocity. The circuit therefore produces signal $\Sigma + kj\Delta$ in the course of one cycle and $\Sigma - kj\Delta$ in the course of the next cycle.

The sum signal Σ and the difference signal Δ are first of all demodulated on the basis of the reference signal from modulator 9. An amplitude and phase detector 401 receives the incoming signal on the one hand and the reference signal on the other and supplies the demodulated sum signal Σ. A second amplitude and phase detector 402 receives the incoming sum signal and the reference signal after the phase of the latter has been shifted by 90° in a phase-shifter 403 and supplies a demodulated signal $j\Sigma$. Signal Δ is demodulated in identical fashion, by means of two amplitude and phase detectors 404, 405 and a 90° phase-shifter 406, so as to yield demodulated signals Δ and $j\Delta$. These latter signals are then applied to two multiplier circuits 410 and 411 which are controllable-gain amplifiers and at the outputs of which appear the signals $k\Delta$ and $jk\Delta$.

Sign-changing circuits 430 and 431 are connected to the outputs of multipliers 410 and 411 respectively. These circuits invert the polarity of their input signals during one pulse cycle out of two, the polarity remaining unchanged in alternate cycles.

A first adder circuit 420 is connected to the outputs of detector 401 and sign-changer 431. A subtractor circuit 421 is connected to the outputs of detector 402 and sign-changer 430. In the course of one cycle, circuits 420 and 421 supply signals $\Sigma + kj\Delta$ and $j(\Sigma + kj\Delta)$ respectively. In the next cycle they therefore supply $\Sigma - kj\Delta$ and $j(\Sigma - kj\Delta)$. The sign-changing circuits are actuated simultaneously from the overall synchronizing means for the radar system, which are represented by a circuit 440.

The value of coefficient k is calculated in a circuit 450 which receives details of the estimated velocity V and the repetition period T (from the synchronizing circuit 440) and of the direction of the antenna with respect to the vector for the velocity of the aircraft, as represented by the elevation angle $s_a$ and the azimuth angle $g_a$.

The signals $\Sigma + kj\Delta$ and $j(\Sigma + kj\Delta)$ from one cycle are filtered in integrators 460 and 461 and then directed by a switch 601 to a first section of a memory 602. In the next cycle signals $\Sigma - jk\Delta$ and $j(\Sigma - jk\Delta)$ are switched over, after being integrated, to the second section of memory 602. Switch 601 is controlled by the synchronizing circuit 440.

The measuring circuit 7 then measures the difference in phase between the contents of the two sections of the memory. The integrating period of integrators 460 and 461 is of a well-defined duration. The beginning and the end of integration are governed by the overall synchronizing apparatus for the radar. The integrators thus perform the function of range gates.

FIG. 4 shows details of the phase-measuring circuit 7 together with the switch 601 and the memory 602 are once again shown of FIG. 3. The memory 602 is seen to consist of a first section (top) which contains the signals received during a first cycle and a second section (bottom) which contains the signals received during an immediately following second cycle.

Each of the two sections of the memory is thus able to store two signals which are in quadrature with each other. Signals are entered in the two sections of the memory by means of switch 601, which selects the section where their inscription is to take place, and by means of the synchronizing circuit 440 which gives instructions for their entry. The signals are inscribed as soon as the period of integration has ended in integrators 460 and 461, as shown by graph B in FIG. 5 relating to the integration period and graphs C and D relating to storage. Circuit 440 also gives instructions for the contents of the memory to be read out in one cycle out of two, as shown by graph E in FIG. 5. The two outputs of the upper memory section are connected to two multiplier circuits 701 and 702. The two outputs of the lower memory section are connected to two other multipliers 703 and 704. Each of the multipliers has a second input connected to an oscillator 705 of frequency $f_o$. This oscillator has two outputs which supply two signals in quadrature with each other. The sine output is connected to multipliers 701 and 704 and the cosine output feeds multipliers 702 and 703.

A two-input substractor 706 is connected to the outputs of multipliers 701 and 702. An adder 707, which likewise has two inputs, is connected to the two multipliers 703 and 704. Circuits 706 and 707 are followed by limiters 708 and 709 respectively. The two inputs of a phase-detector 710 are connected to the outputs of the two limiters and the detector supplies at its output a signal proportional to the phase difference between the input signals, that is to say an indication of the velocity of the moving object when the control loop is open.

The phase-measuring circuit 7 operates as follows:

Let is be assumed that the signals contained in the upper section of the memory 602 are of the form A sin $\phi$ 1 and A cos $\phi$ 1. These two signals are multiplied by respective signals sin $2\pi f_o t$ and cos $2\pi f_o t$ from oscillator 705. The output of substractor 706 supplies:

A cos $\phi$ 1 cos $2\pi f_t - $ A sin $\phi$ 1 sin $2\pi f_o t =$ A cos ($2\pi f_o t$ + $\phi$ 1). Let the signals contained in the second section of memory 602 be B sin $\phi$ 2 and B cos $\phi$ 2. These are multiplied by signals cos $2\pi f_o t$ and sin $2\pi f_o t$ respectively and adder 707 gives:

B sin $\phi$ 2 cos $2\pi f_o t$ signals + B cos $\phi$ 2 sin $2\pi f_o t =$ B sin $(2\pi f_o t + \phi 2)$ The phase detector therefore supplies an output signal proportional to the difference $\phi 1 - \phi 2 = \pi/2$.

In the form shown the system is able to function only if the signals $\Sigma + kj\Delta$ are stored solely in the first section of the memory 602 and the signals $\Sigma - kj \Delta$ solely in the second section thereof.

However, a certain lack of symmetry is inevitable between the two memory sections, between the two calculating channels, or between the memory sections and the phase detector.

Such a dissymmetry causes an undesirable DC voltage to appear at the output of detector 710, when the measurement system is operating as a closed loop. This voltage, when integrated, may be considerable and may displace the demodulation reference.

To overcome such a defect, the calculating channels along which the signals travel are changed over from one pair of pulse cycles to the next. During the first two cycles, with circuit 430 inverting in the first and circuit 431 inverting in the second cycle, signals $\Sigma + jk \Delta$ and $j(\Sigma + kj \Delta)$ are stored in the first memory section (cycle No. 1) and signals $\Sigma - kj \Delta$ and $j(\Sigma - kj \Delta)$ are stored in the second memory section (cycle No. 2). They are then processed by the appropriate circuits. In the course of the next two cycles, with the same order of inversion in circuits 430 and 431, signals $\Sigma + kj \Delta$ and $j(\Sigma + kj \Delta)$ are stored in the second section (cycle No. 3) and signals $\Sigma - kj \Delta$ and $j(\Sigma - kj \Delta)$ are stored in the first section (cycle No. 4). To prevent the phase difference from being evaluated in a negative sense, a further sign-changing circuit 711 is placed at the output of detector 710. This being so, the continuity of the phase measurement is preserved while the measurement error is canceled out every four cycles. The output of the sign-changer is connected to the integrater 10 in the control loop which was described above with reference to FIG. 2. Since integration takes place over a large number of cycles, any error due to disymmetry is reduced to virtually zero.

Switch 601 thus reverses in every other cycle, as does the sign-changer 711.

The system as a whole is synchronized from the sychronizing device 440 (FIG. 3). This unit has to furnish the times at which the radar emits pulses and at which integration begins and ends in integrator 460 and 461 (FIG. 3) and to supply control signals for the sign-changers 430, 431 (FIG. 3) and 711 (FIG. 4), for switch 601, and for read-out from and writing in memory 602.

Figure 5:
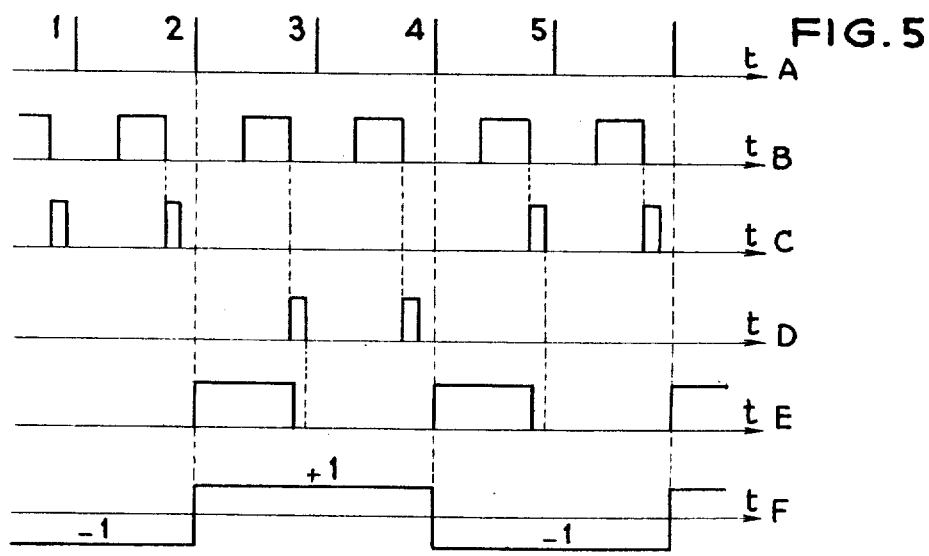

Graph A of FIG. 5 shows the pulses for synchronizing the transmitter. These pulses coincide with the transmitted pulses and are numbered 1 to 5 to make the subsequent explanation clearer.

Graph B shows the control signals for integrator 460 and 461 which both operate in the same way. The times at which integration begins and ends, measured from the transmitted pulse, depend on the range band encompassing the distance of the craft from ground.

Graphs C and D show the pulses which control writing in the first and second sections, respectively, of store 602; graph E represents pulses controlling read-out, during which phase-measurement takes place.

Finally, graph F shows the sign given to the output signal from phase detector 710. It will be noted that if signal $\Sigma + kj \Delta$ is registered in the first sectionof the memory (pulse No. 1) and signal $\Sigma - kj \Delta$ in the second section (pulse No. 2), the sign is equal to +1. In the case of pulse No. 3, switch 601 does not change position and signal $\Sigma + kj \Delta$ is registered in the second section of the memory. When pulse No. 4 occurs, signal $\Sigma - jk \Delta$ is entered in the first section. At the time of read-out the sign of the sign-changer is therefore −1. In every case the control of read-out becomes effective only after signal $\Sigma - jk \Delta$ has been registered.

The invention is chiefly applicable to aerial navigation systems, or to marine systems using acoustic waves.

What is claimed is:

1. A system for measuring, with the aid of the Doppler effect, the velocity of a moving object with respect to a fixed object as projected onto a reference axis, comprising:

antenna means trained along said axis;

transmitting means coupled to said antenna means for sending out waves toward said fixed object for reflection thereby;

receiving means coupled to said antenna means for collecting waves reflected by said fixed object and deriving therefrom a sum signal $\Sigma$ and a difference signal $\Delta$ which are functions of angular velocity divergences from said axis;

demodulating means connected to said receiving means and including circuitry for additively and subtractively combining said sum and difference signals and synthesizing composite signals $\Sigma + kj \Delta$ and $\Sigma - kj \Delta$ therefrom, $k$ being a selectable coefficient;

frequency-generating means connected to said demodulating means for supplying a variable reference frequency thereto, said frequency-generating means being provided with a control input for varying said reference frequency;

measuring means having a pair of inputs connected to said demodulating means for receiving said composite signals therefrom with a predetermined relative delay and for emitting an output signal proportional to the phase difference of the relatively delayed signals $\Sigma + kj \Delta$ and $\Sigma - kj \Delta$, said phase difference varying with the velocity of the moving object as projected onto said axis; and integrating means connected between said measuring means and said control input for feeding back to said frequency-generating means a corrective voltage to stabilize said output signal.

2. A system as defined in claim 1, further comprising a source of presetting voltage and switch means for selectively connecting said control input either to said integrating means or to said source.

3. A system for measuring, with the aid of the Doppler effect, the velocity of a moving object with respect to a fixed object as projected onto a reference axis, comprising:

a monopulse antenna trained along said axis;

transmitting means coupled to said antenna for sending out periodic radio-frequency pulses toward said fixed object for reflection thereby;

receiving means coupled to said antenna for collecting pulses reflected by said fixed object and deriving therefrom a sum signal $\Sigma$ and a difference signal $\Delta$ which are functions of angular velocity divergences from said axis;

demodulating means connected to said receiving means and including circuitry for additively and subtractively combining said sum and difference signals and synthesizing composite signals $\Sigma + kj \Delta$ and $\Sigma - kj \Delta$ therefrom, $k$ being a selectable coefficient;

frequency-generating means connected to said demodulating means for supplying a variable reference frequency thereto, said frequency-generating means being provided with a control input for varying said reference frequency;

first and second memory means provided with input circuits connected to said demodulating means for receiving said composite signals therefrom;

switchover means in said input circuits for directing the composite signal $\Sigma + kj\, \Delta$ to one of said memory means and the composite signal $\Sigma - kj\, \Delta$ to the other of said memory means in consecutive pulse cycles for temporary storage therein; and measuring means having a pair of inputs respectively connected to said first and second memory means for receiving the stored signals therefrom during every other pulse cycle and for emitting an output signal proportional to the phase difference of the stored signals $\Sigma - kj\, \Delta$ and $\Sigma - kj\, \Delta$, said phase difference varying with the velocity of the moving object as projected onto said axis.

4. A system as defined in claim 3, including synchronizing means for controlling the transmission of said pulses, said synchronizing means being connected to said switchover means for directing the signal $\Sigma - kj\, \Delta$ to said first memory means in the first cycle and to said second memory means in the third cycle of a recurrent sequence of four consecutive pulse cycles and for directing the signal $\Sigma - kj\, \Delta$ to said second memory means in the second cycle and to said first memory means in the fourth cycle of said sequence.

5. A system as defined in claim 4, further comprising sign-changing means connected to said measuring means and controlled by said synchronizing means for inverting the polarity of said output signal in everyy other pulse cycle.

6. A system as defined in claim 5, further comprising integrating means connected between said sign-changing means and said control input for feeding back to said frequency-generating means a corrective voltage to stabilize said output signal.

* * * * *